(12) United States Patent
Boyd et al.

(10) Patent No.: US 8,248,269 B1
(45) Date of Patent: Aug. 21, 2012

(54) ADVANCED METERING INFRASTRUCTURE INSTALLATION AUDITING

(75) Inventors: David W. Boyd, Hoover, AL (US); Anthony S. Bell, Chelsea, AL (US); Derl Rhoades, Gardendale, AL (US)

(73) Assignee: Southern Company Services, Inc., Atlanta, GA (US)

( * ) Notice: Subject to any disclaimer, the term of this patent is extended or adjusted under 35 U.S.C. 154(b) by 603 days.

(21) Appl. No.: 12/460,263

(22) Filed: Jul. 16, 2009

(51) Int. Cl.
  *G08C 15/06* (2006.01)
(52) U.S. Cl. .............................. 340/870.03; 340/870.02
(58) Field of Classification Search ............. 340/870.03, 340/870.02, 310.01; 705/412, 418
  See application file for complete search history.

(56) References Cited

U.S. PATENT DOCUMENTS

| | | | |
|---|---|---|---|
| 6,088,659 A * | 7/2000 | Kelley et al. ................... | 702/62 |
| 6,199,068 B1 * | 3/2001 | Carpenter ............................. | 1/1 |
| 7,088,014 B2 * | 8/2006 | Nierlich et al. .................. | 307/38 |
| 2002/0130768 A1 * | 9/2002 | Che et al. .................. | 340/310.01 |
| 2004/0140908 A1 * | 7/2004 | Gladwin et al. .......... | 340/870.02 |
| 2006/0071811 A1 * | 4/2006 | Christopher et al. ..... | 340/870.02 |
| 2006/0071812 A1 * | 4/2006 | Mason et al. ............ | 340/870.02 |
| 2008/0177678 A1 * | 7/2008 | Di Martini et al. ........... | 705/412 |
| 2008/0224892 A1 * | 9/2008 | Bogolea et al. ............. | 340/870.3 |
| 2009/0192950 A1 * | 7/2009 | King et al. ..................... | 705/418 |

* cited by examiner

*Primary Examiner* — Jean B Jeanglaude
(74) *Attorney, Agent, or Firm* — John J. Timar; Womble Carlyle Sandridge & Rice LLP

(57) ABSTRACT

A method, system, and computer readable storage medium for auditing the installation of smart meters via a computer system. The method includes receiving a plurality of installation data for each smart meter installed; loading the plurality of installation data into an auditing utility operating on the computer system based on auditing criteria; performing an audit for each smart meter installed via the auditing utility; submitting the audit for each smart meter installed for recording in an audits database; verifying the audit for each smart meter installed; and generating and analyzing audit reports stored in the audits database.

17 Claims, 21 Drawing Sheets

ADVANCED METERING INFRASTRUCTURE INSTALLATION AUDITING

TECHNICAL FIELD

Embodiments of the invention relate generally to advanced electricity metering systems and, more particularly, to auditing the installation of advanced electric meters.

BACKGROUND OF THE INVENTION

Within the United States, many utilities are either upgrading to automated smart meters or are planning to do so. These digital meters provide intelligence and additional functionality and work in support of SmartGrid initiatives. To support this upgrade, utilities will need to be able to manage meter installation and to automate the tracking of meter numbers in their customer information systems.

Advanced Metering Infrastructure (AMI) is a term referring to electric meters that measure and record energy usage data on a predefined schedule through various communication media. The infrastructure includes hardware, software, communications, meter data management software and associated customer systems. The meters in an AMI system are often referred to as smart meters, since they can use collected data based on programmed logic.

A smart meter is an advanced meter that identifies energy consumption in more detail than a conventional meter, and that can communicate with a local utility via a communications network for energy usage monitoring and billing purposes. Once the smart meter program is fully deployed by an energy service provider and its subsidiary utilities, smart meters will allow customers to mange energy consumption by providing detailed energy usage information and rate options.

SUMMARY OF THE INVENTION

The embodiments include two utilities to support the Automated Metering Initiative (AMI) effort: (1) the Change Meter Order (CMO) utility, and (2) the AMI Installation Audit utility. The Change Meter Order (CMO) utility provides an automated process to update meter numbers in the customer information system. The AMI Installation Audit utility records meter installation audits in a database and uses data from the audits to create reports based on the audit findings.

In one embodiment, a method is provided for auditing the installation of smart meters via a computer system. The method includes receiving a plurality of installation data for each smart meter installed; loading the plurality of installation data into an auditing utility operating on the computer system based on auditing criteria; performing an audit for each smart meter installed via the auditing utility; submitting the audit for each smart meter installed for recording in an audits database; verifying the audit for each smart meter installed; and generating and analyzing audit reports stored in the audits database.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

DETAILED DESCRIPTION

Figure 1:
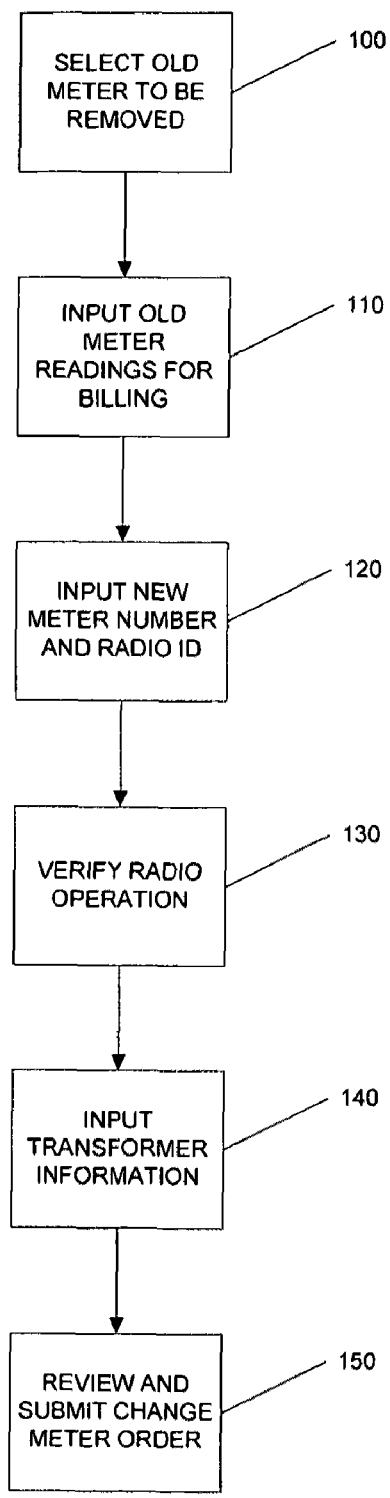
FIG. 1 illustrates an overview flowchart of the process steps implemented by a Change Meter Order Automation utility in an exemplary embodiment.

The following description is provided as an enabling teaching of embodiments of the invention including the best, currently known embodiment. Those skilled in the relevant art will recognize that many changes can be made to the embodiments described, while still obtaining the beneficial results of the disclosed embodiments. It will also be apparent that some of the desired benefits of the embodiments described can be obtained by selecting some of the features of the disclosed embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

Embodiments described herein include two utilities that were developed to support the Automated Metering Initiative (AMI) effort—the Change Meter Order (CMO) utility and the AMI Installation Audit utility. Due to the volume of meter upgrades required for AMI conversion, the Change Meter Order (CMO) utility was developed to provide an automated process to update meter numbers in the customer information system.

The CMO utility automates and simplifies the Change Meter Order (CMO) process. This utility allows the user to successfully record information during a meter change, specifically for AMI meter changes. Each CMO is a six step process: (1) select the old meter to be removed; (2) input readings for the old meter for billing purposes; (3) input new AMI meter information (i.e., new meter number and radio ID); (4) verify radio operation, (i.e., retrieve GPS coordinates and verify AMI meter is working properly; (5) input transformer information; and (6) review and submit CMO.

These steps ensure that all information required for a valid CMO is obtained. This utility also avoids installing broken AMI meters by verifying that the new meter is working properly. Once complete, the CMOs are uploaded to the customer information database.

The AMI Installation Audit utility evaluates the performance of the AMI installation vendor by creating and recording audits of AMI meter installations. Due to the volume of meter upgrades required for AMI conversion, a structured and managed approach to create and record audits was developed.

The AMI Installation Audit utility records the audits in a database and uses data from the audits to create reports based on the audit findings. These reports include tables and graphs that provide visual aids in determining whether or not all contractual obligations are being met. The reports can be analyzed and feedback given to the installation vendor accordingly. The audits examine the following elements of a meter installation: (1) meter sealing; (2) condition of meter location; (3) accuracy of meter GPS coordinates; (4) accuracy of transformer GPS coordinates; (5) correct transformer number; (6) proper removal of surge protector; (7) proper repair of meter socket; (8) customer notification before meter change; (9) correct meter radio ID; (10) performance of radio binding test.

The AMI Installation Audit utility includes several tools that enhance the audit process, as follows: (1) Global Positioning System (GPS) capabilities—GPS distance calculations are embedded to analyze accuracy of installer; (2) support of Sensus microtransceiver to test radio on AMI meter; (3) map generation based on GPS coordinates or addresses that can be utilized by map programs such as Microsoft Streets & Trips; (4) port scanner used to locate external devices such as GPS; (5) reporting capabilities to examine vendor performance, individual installer performance, and auditor performance; and (6) barcode scanner compatibility.

Embodiments described herein utilize underlying smart meter technology, such as that provided by the Sensus FlexNet® Advanced Metering Infrastructure network. Briefly, the Sensus network of smart meters provides meter reading for monthly billing, two-way communication between customers and the company, outage detection, and remote reconnects and disconnects. FlexNet relays communications directly from meter to receiver over a dedicated frequency awarded by the Federal Communications Commission (FCC). FlexNet SmartPoint transmitters collect meter consumption data and status information and communicate that data to tower gateway base stations. The tower gateway base stations use existing radio towers and forward data encrypted with Advanced Encryption Standard (e.g., AES 256) encryption via hardware links to a Regional Network Interface (RNI), the data storage and processing center for the Sensus FlexNet network.

FIG. 1 illustrates an overview flowchart of the process steps implemented by a Change Meter Order Automation utility in an exemplary embodiment. In step 100, the old meter to be removed is selected. In step 110, the readings for the old meter are input for billing purposes. In step 120, the new meter information including meter number and radio ID are input. Next, in step 130, radio operation is verified. This is followed in step 140 with the input of transformer information. In step 150, the change meter order is reviewed and then submitted. These process steps are described in more detail below.

These steps ensure that all information required for a valid CMO is provided. The CMO Automation utility also verifies that all meters set are working properly by testing the meter's radio. This limits the number of broken meters that are installed. Once complete, the files created by the CMO program are uploaded to a server that updates the customer information database. Customers are billed based on the meter tied to them in the customer database. When there is a meter change, it is imperative that the information is updated in the database and that it is updated reliably.

The first step of the CMO process is to select the meter to remove. The CMO Automation utility loads in a text file chosen by the user and loads the information into a textbox window as exemplified by the user interface illustrated in FIG. 7. This textbox displays the route, bill group, old meter number, address and premise number. Once selected, the window displays additional information such as customer name, GPS coordinates and the location of the meter on the premise.

Figure 2:
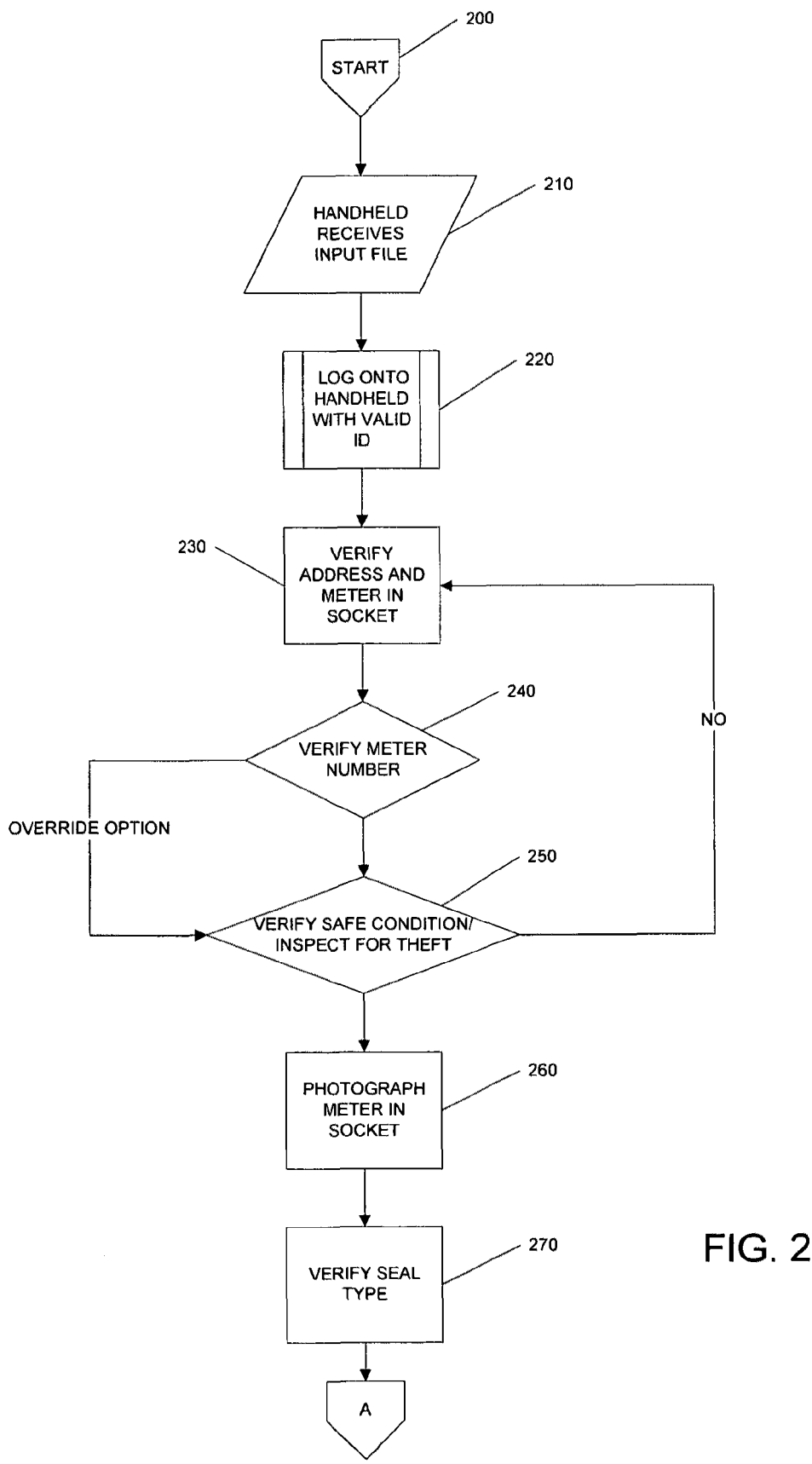
FIG. 2 illustrates a detailed flowchart of the select the meter to remove process step implemented by a Change Meter Order Automation utility in an exemplary embodiment.

FIG. 2 illustrates a detailed flowchart of the select the meter to remove process step implemented by a Change Meter Order Automation utility in an exemplary embodiment. The CMO Change Meter Order Automation utility is launched in start block 200. The handheld device used by the user (i.e., installer) receives an input file as indicated in block 210. The user logs onto the handheld with a valid identification as indicated in block 220. The location address and the meter in the socket are verified as indicated in step 230. Verification of the meter number is performed as indicated in decision block 240. If the meter number is verified, the user inspects the meter to verify that it is in safe condition for removal as indicated in decision block 250. If the meter number is not verified in decision block 240, an override option enables the user to continue the process step in decision block 250. After verifying that the meter is in safe condition, the user can photograph the meter in the socket for visual identification as indicated in block 260. This first process step is completed as indicated in block 270 with the verification of the socket seal type.

Figure 8:
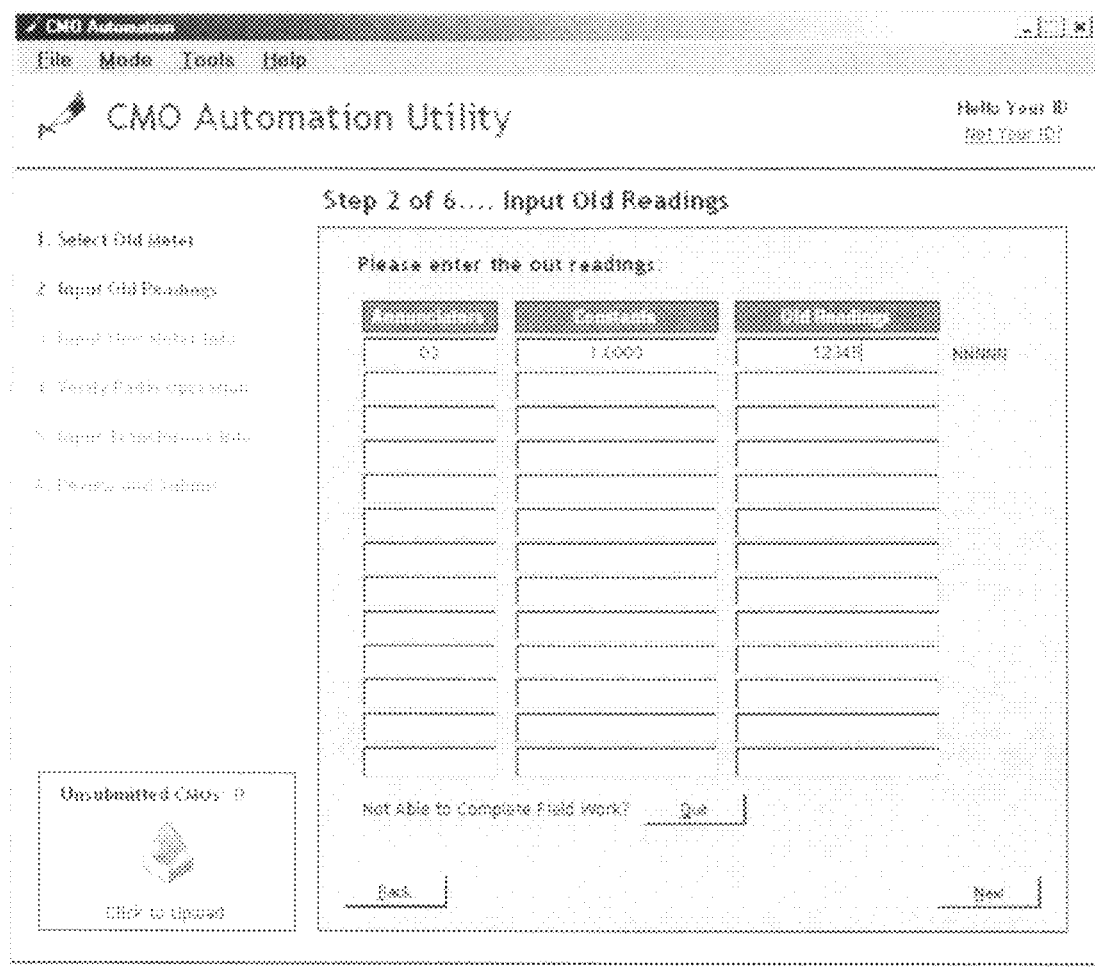
FIG. 8 illustrates a user interface for the input old meter readings process step implemented by a Change Meter Order Automation utility in an exemplary embodiment.

The second step of the CMO process is to input old meter readings ("out readings") of the meter being removed. This is an important step in order for accurate billing. FIG. 8 illustrates a user interface for the second process step. The Change Meter Order Automation utility loads the correct rows based on the meter code. In the example of FIG. 8, the readings required are kilowatt hours (KWh) and demand. At this step, the user may encounter circumstances that do not allow him to continue. In this case, the user would click the "Quit" button. The user will be prompted to give a reason why the work could not be completed. The second process step also has a high/low test built into it. If the old readings seem incorrect based on historic usage, a message will be displayed prompting the user to confirm the readings.

Figure 3:
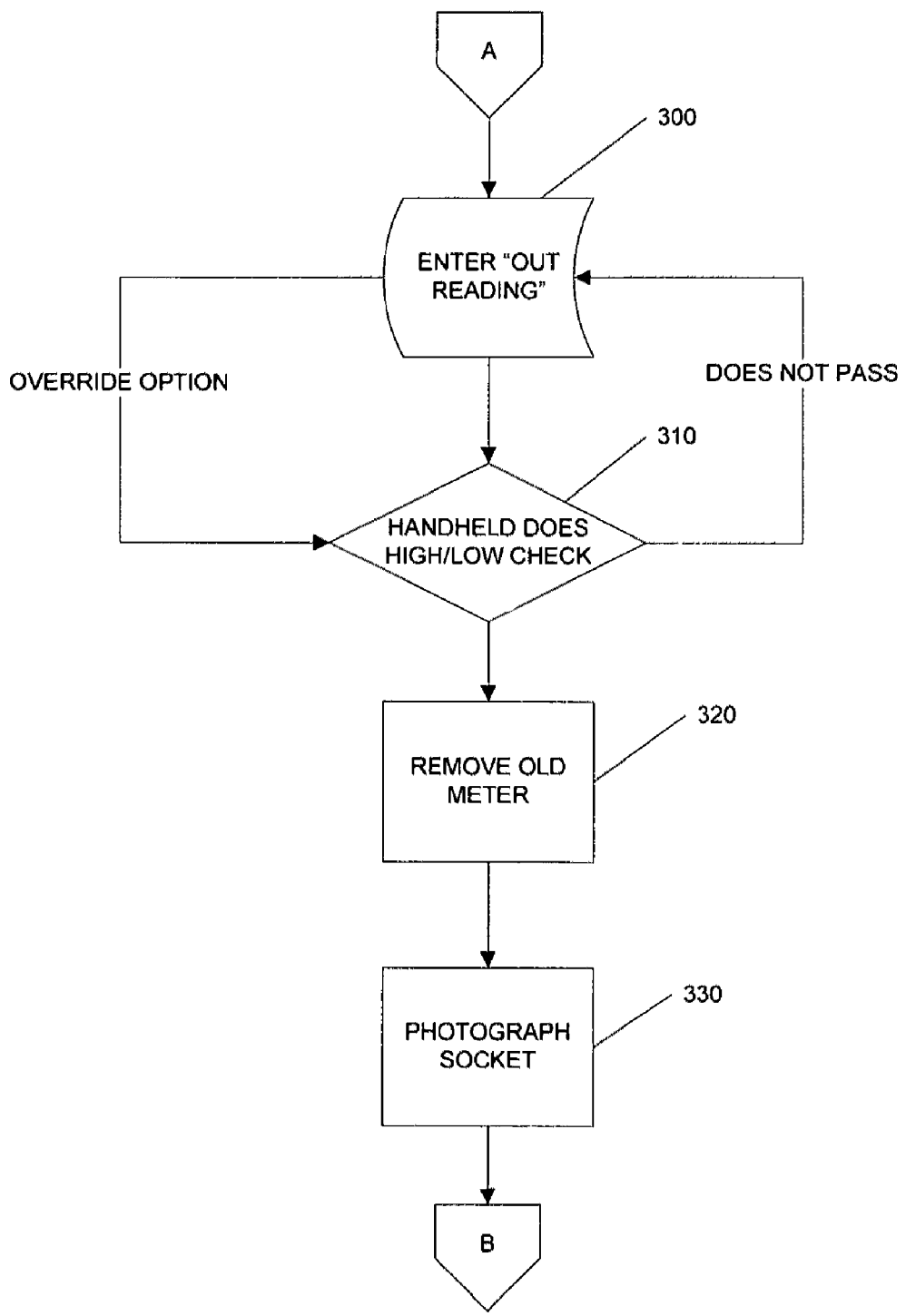
FIG. 3 illustrates a detailed flowchart of the input old meter readings process step implemented by a Change Meter Order Automation utility in an exemplary embodiment.

FIG. 3 illustrates a detailed flowchart of the input old meter readings process step implemented by the Change Meter Order Automation utility in an exemplary embodiment. The user enters an "out reading" for the old meter as indicated in block 300. Next, the handheld device does a high/low check as indicated in decision block 310. If the high/low check does not pass, the user re-enters an "out reading." There is also an override option from block 300. If the high/low check passes, the old meter will then be removed by the user as indicated in block 320. The input old meter readings process step ends with the user photographing the socket as indicated in block 330.

Figure 9:
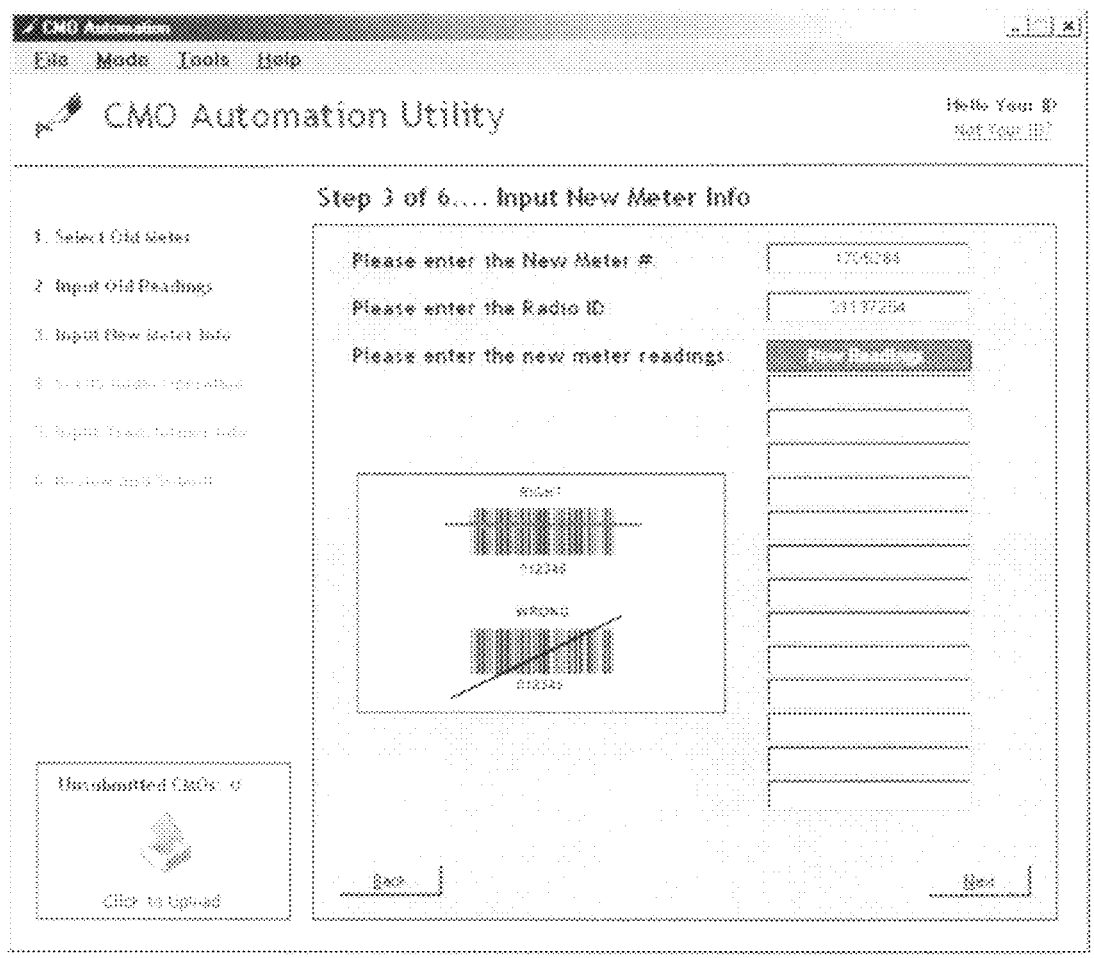
FIG. 9 illustrates a user interface for the input new meter information process step implemented by a Change Meter Order Automation utility in an exemplary embodiment.

The third step of the CMO process is to input new meter information including meter number, radio ID, and any "in readings." FIG. 9 illustrates a user interface for the input new meter information process step. The CMO Automation utility is also compatible with barcode scanners. For this step, the user is able to use a barcode scanner to be more efficient and also to prevent the human error element of typing the new meter number and radio ID.

Figure 4:
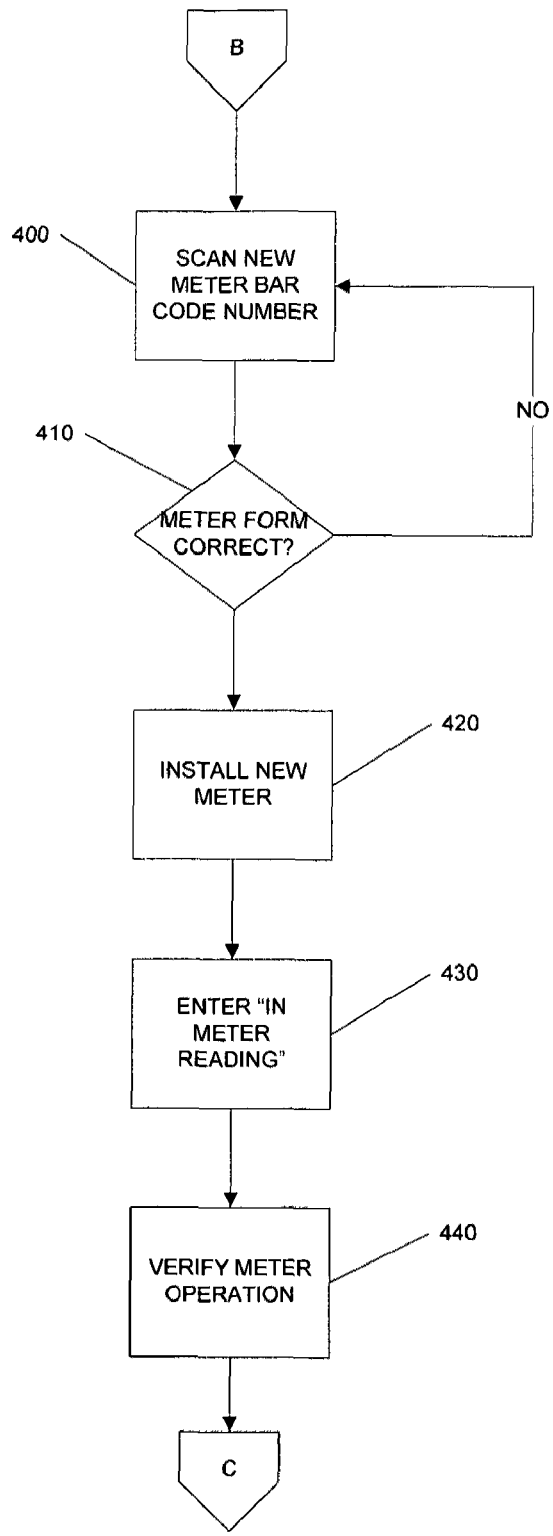
FIG. 4 illustrates a detailed flowchart of the input new meter information process step implemented by a Change Meter Order Automation utility in an exemplary embodiment.

FIG. 4 illustrates a detailed flowchart of the input new meter information process step implemented by a Change Meter Order Automation utility in an exemplary embodiment. The bar code number for the new meter is scanned as indicated in block 400. A determination is made as to whether or not the meter form is correct as indicated in decision block 410. If the meter form is correct, the new meter is installed as indicated in block 420. If the meter form is not correct, the bar code number on the meter is rescanned. The user enters the "in meter reading" as indicated in block 430. Meter operation is then tested and verified as indicated in block 440.

Figure 10:
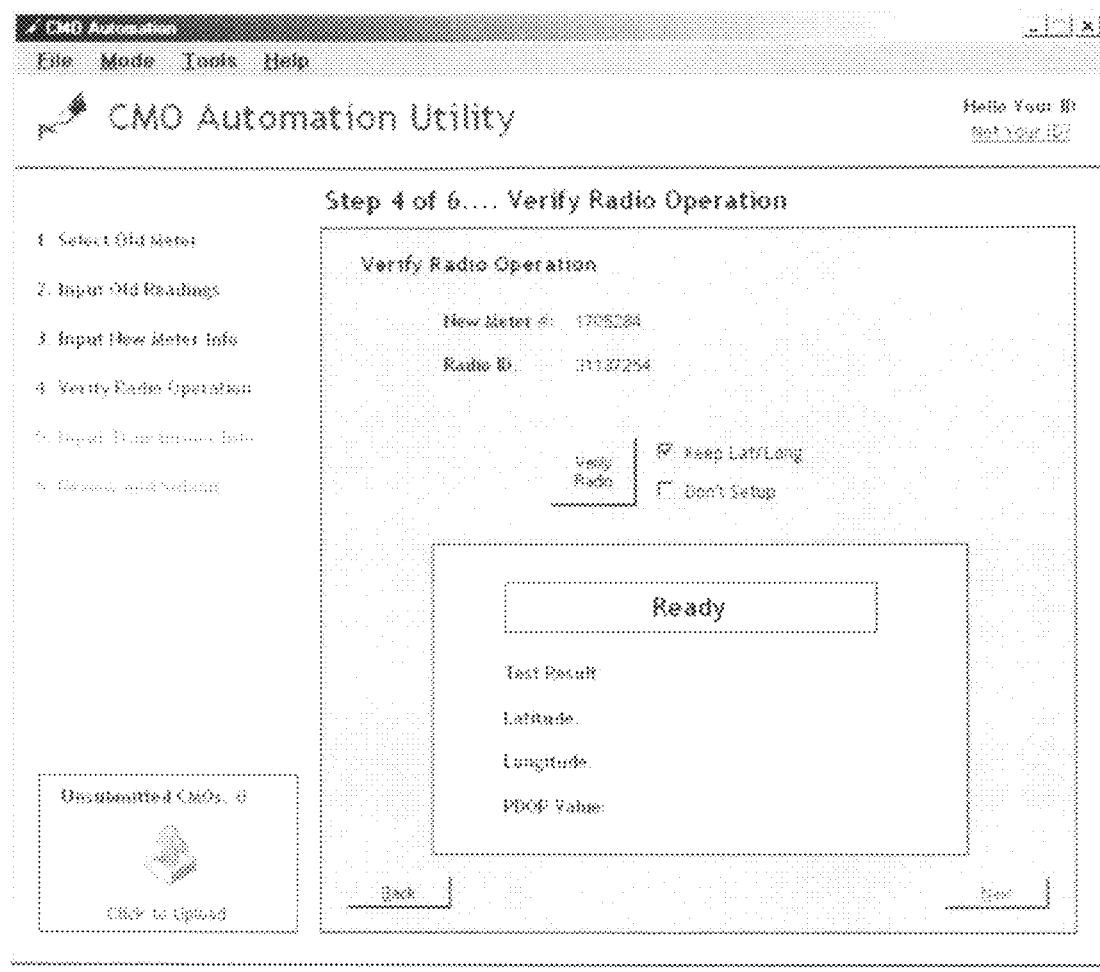
FIG. 10 illustrates a user interface for the verify radio operation process step implemented by a Change Meter Order Automation utility in an exemplary embodiment.
Figure 11:
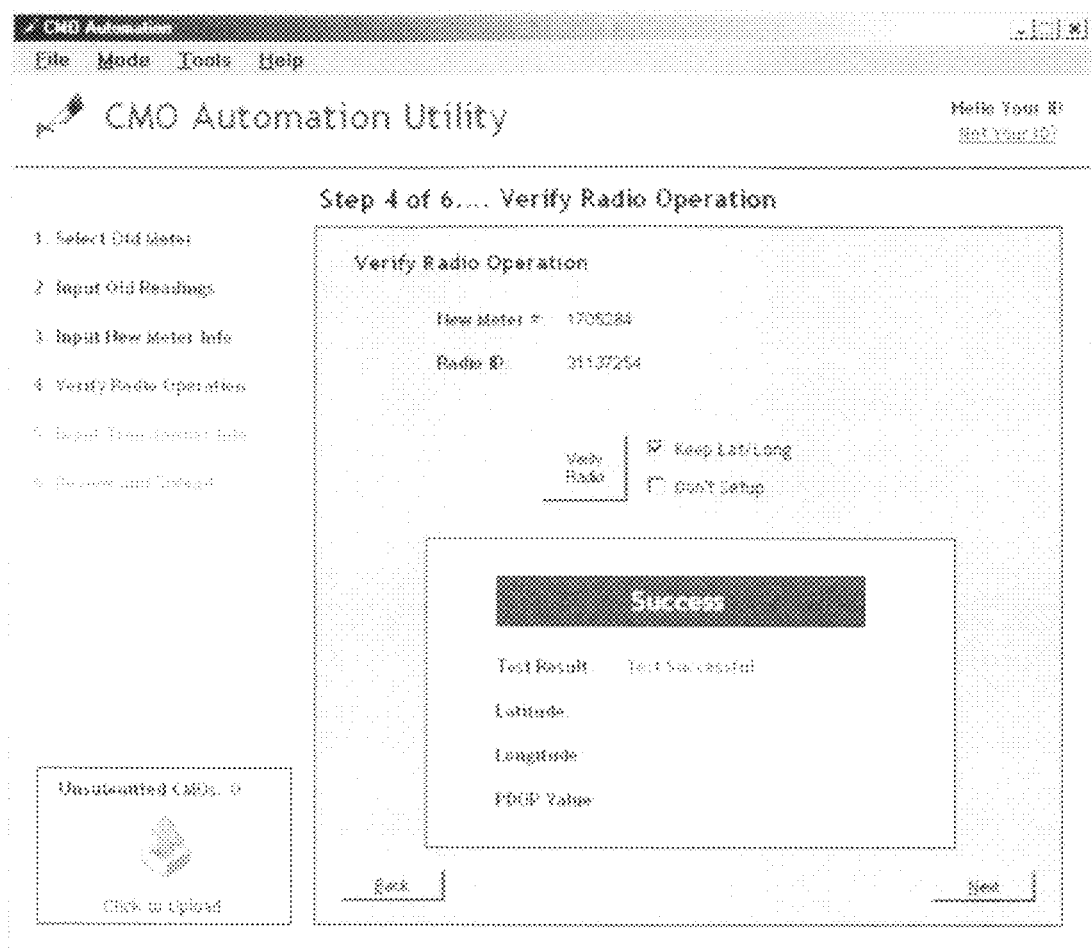
FIG. 11 illustrates a user interface indicating successful completion of the verify radio automation in an exemplary embodiment.

The fourth step of the CMO process is to verify radio operation. This step forces the user to verify that the meter is properly working before the CMO can be submitted. This step can use the Sensus micro-transceiver as well as any external GPS device to retrieve the GPS coordinates of the meter. FIG. 10 illustrates a user interface for the verify radio operation process step. If the radio verification is successful, a user interface similar to the one shown in FIG. 11 can be displayed, and the "Next" button will be enabled. If the radio verification test is unsuccessful, an additional user interface will be displayed indicating the reason for failure. Reasons for failure can include, but are not limited to, a failure to detect the smart meter installed, a communications timeout, a low signal strength, and a GPS failure. The user interfaces would be similar to FIG. 11, but would show "Failed" instead of "Success" and would provide the reason for failure adjacent to "Test Result."

Figure 5:
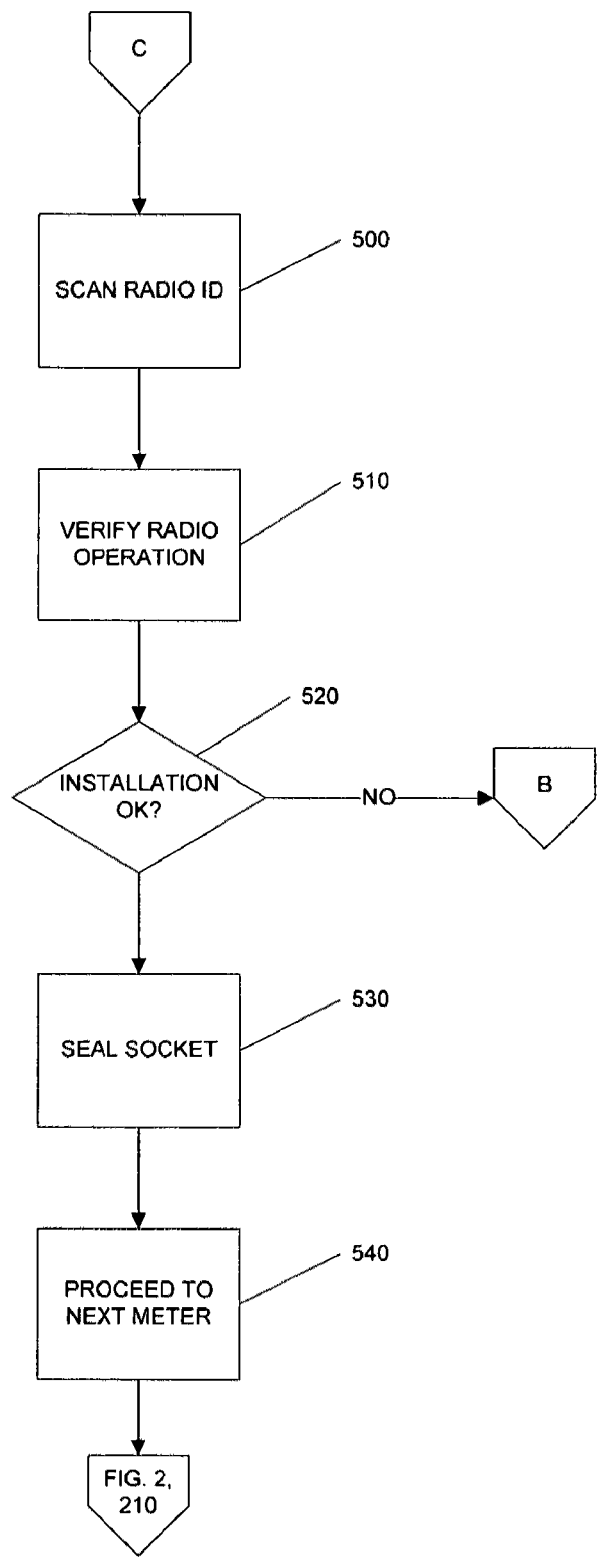
FIG. 5 illustrates a detailed flowchart of the verify radio operation process step implemented by a Change Meter Order Automation utility in an exemplary embodiment.

FIG. 5 illustrates a detailed flowchart of the verify radio operation process step implemented by a Change Meter Order Automation utility in an exemplary embodiment. The radio ID is first scanned as indicated in block 500. Radio operation is then verified as indicated in block 510. A determination is made as indicated in decision block 520 if the meter installation is good. If the meter installation is good, the socket is then sealed as indicated in block 530. Otherwise, the process reverts to block 400 in FIG. 4 to rescan the bar code number on the new meter. Following the sealing of the socket, the user proceeds to the next meter as indicated in block 540.

Figure 12:
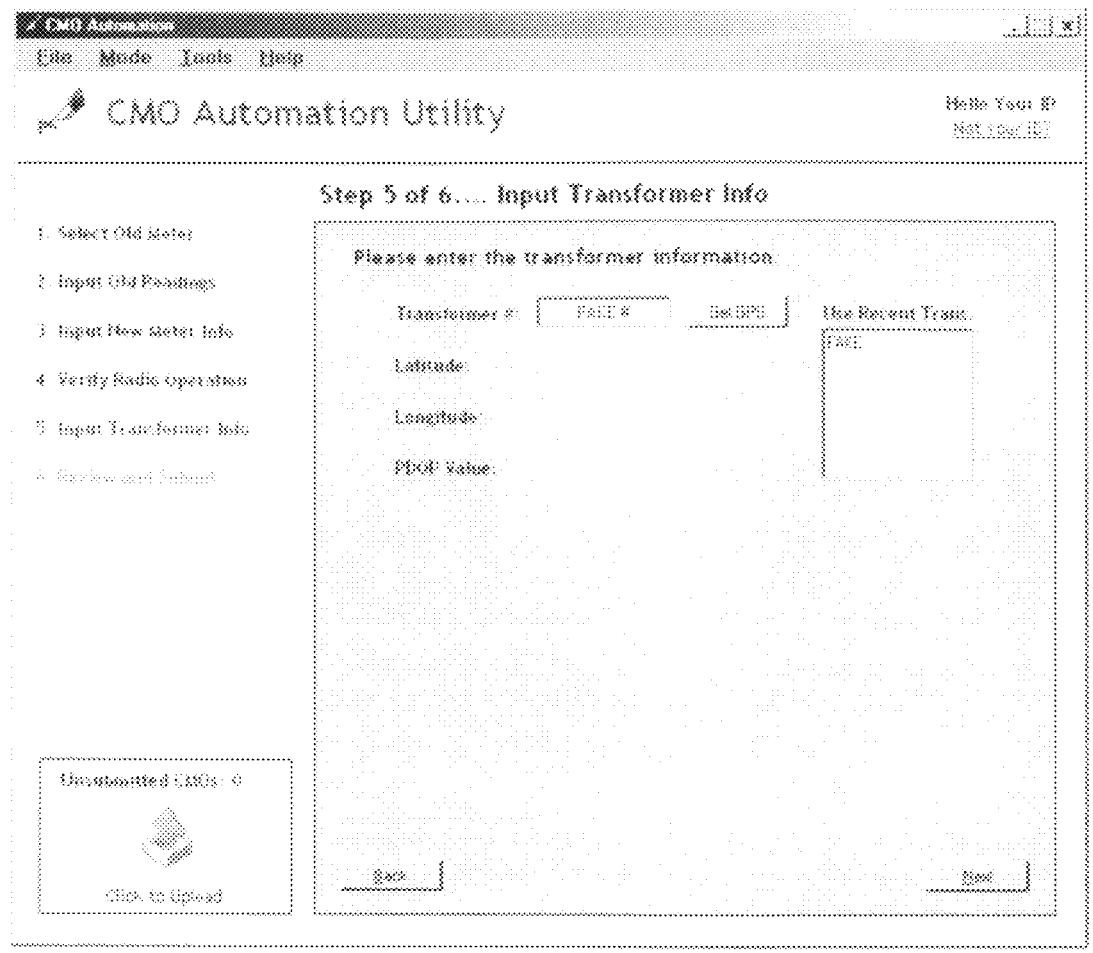
FIG. 12 illustrates a user interface for the input transformer information process step implemented by a Change Meter Order Automation utility in an exemplary embodiment.

The fifth step of the CMO process is to input transformer information. This step asks the user to input the meter's transformer information including transformer station number and GPS coordinates. FIG. 12 illustrates a user interface for the input transformer information process step implemented by a Change Meter Order Automation utility in an exemplary embodiment.

Figure 13:
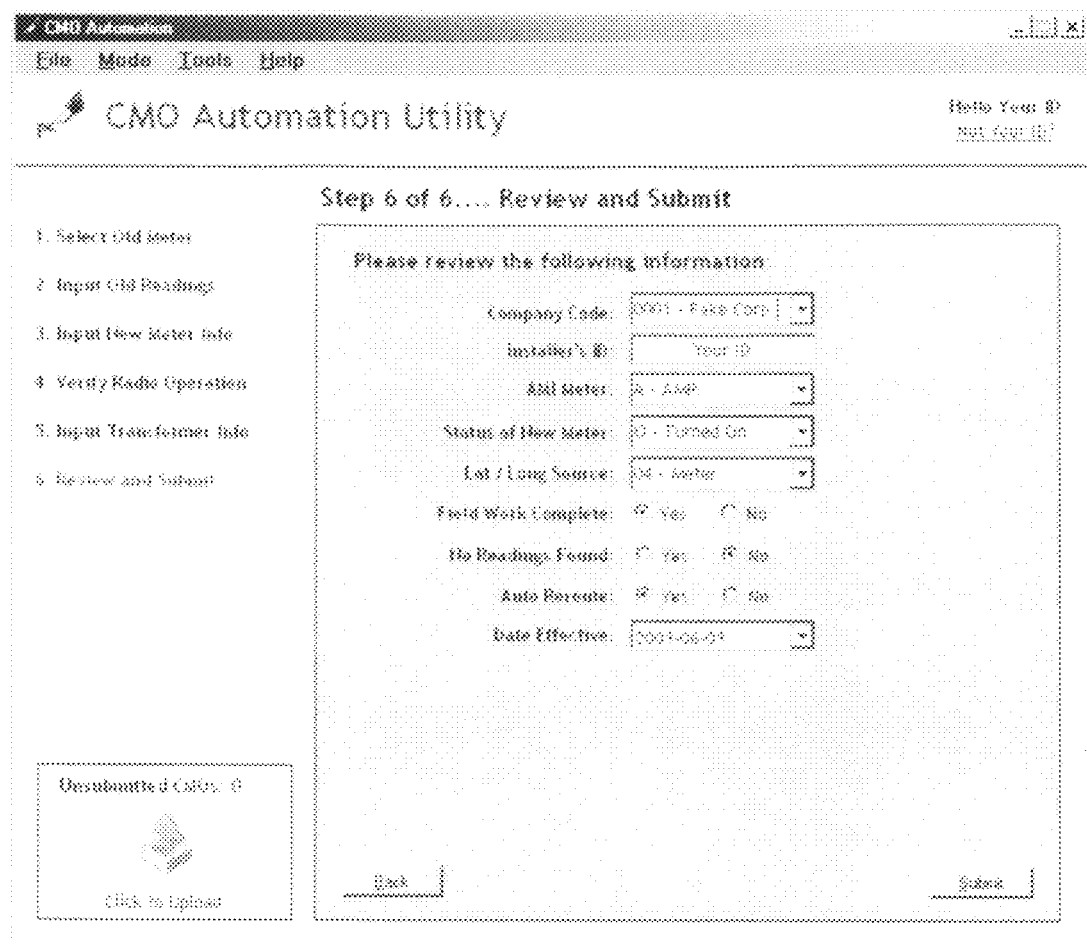
FIG. 13 illustrates a user interface for the review and submit CMO information process step implemented by a Change Meter Order Automation utility in an exemplary embodiment.

The sixth step of the CMO process is to review and submit CMO information. FIG. 13 illustrates a user interface for the review and submit CMO information process step. In order to submit a CMO, the user clicks on the "Upload" button in the lower left corner of the main user interface shown in FIG. 14. The user can submit CMOs only if the number of completed CMOs is greater than zero.

Figure 15:
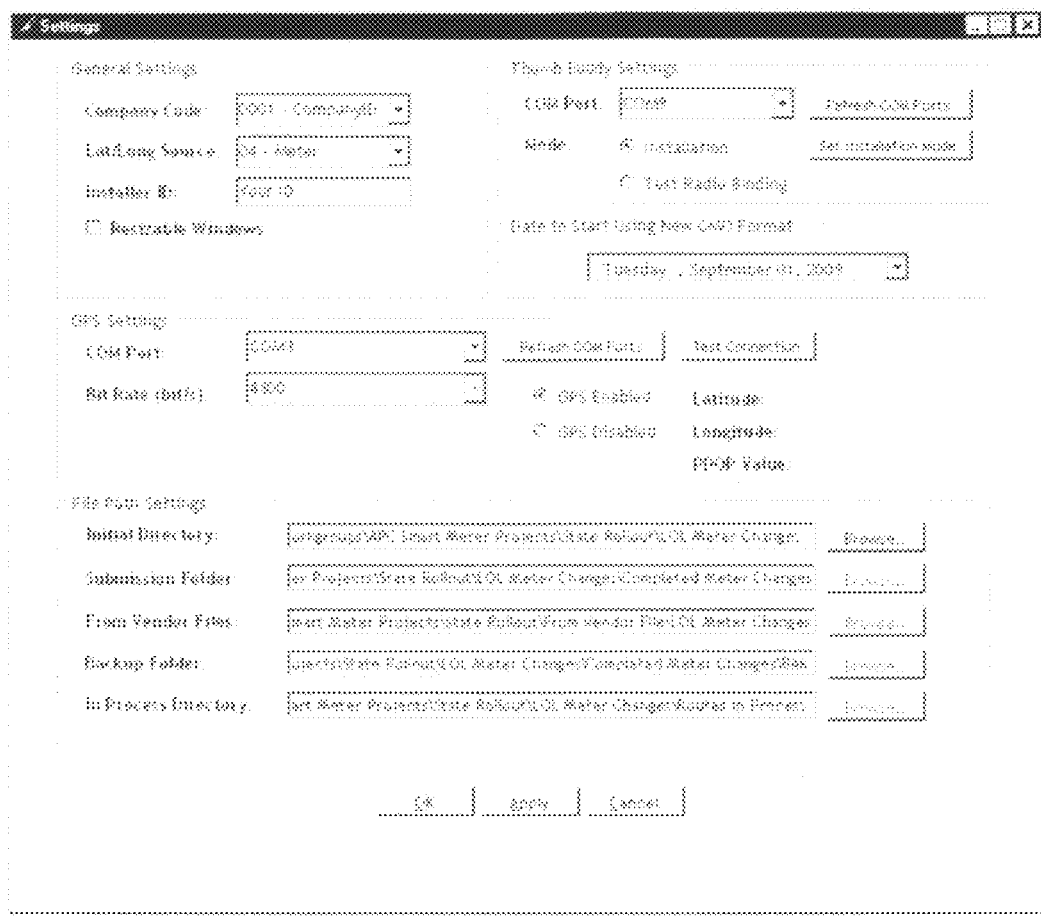
FIG. 15 illustrates a CMO settings user interface in an exemplary embodiment.

The CMO Automation utility enables user settings to be changed via the exemplary CMO general settings user interface illustrated in FIG. 15. The user can change the COM ports for the GPS and Thumb Buddy tools. This user interface allows the user to test the GPS connection and to set the Thumb Buddy to installation mode. The file path settings shown in FIG. 15 can only be changed by the system administrator.

Figure 7:
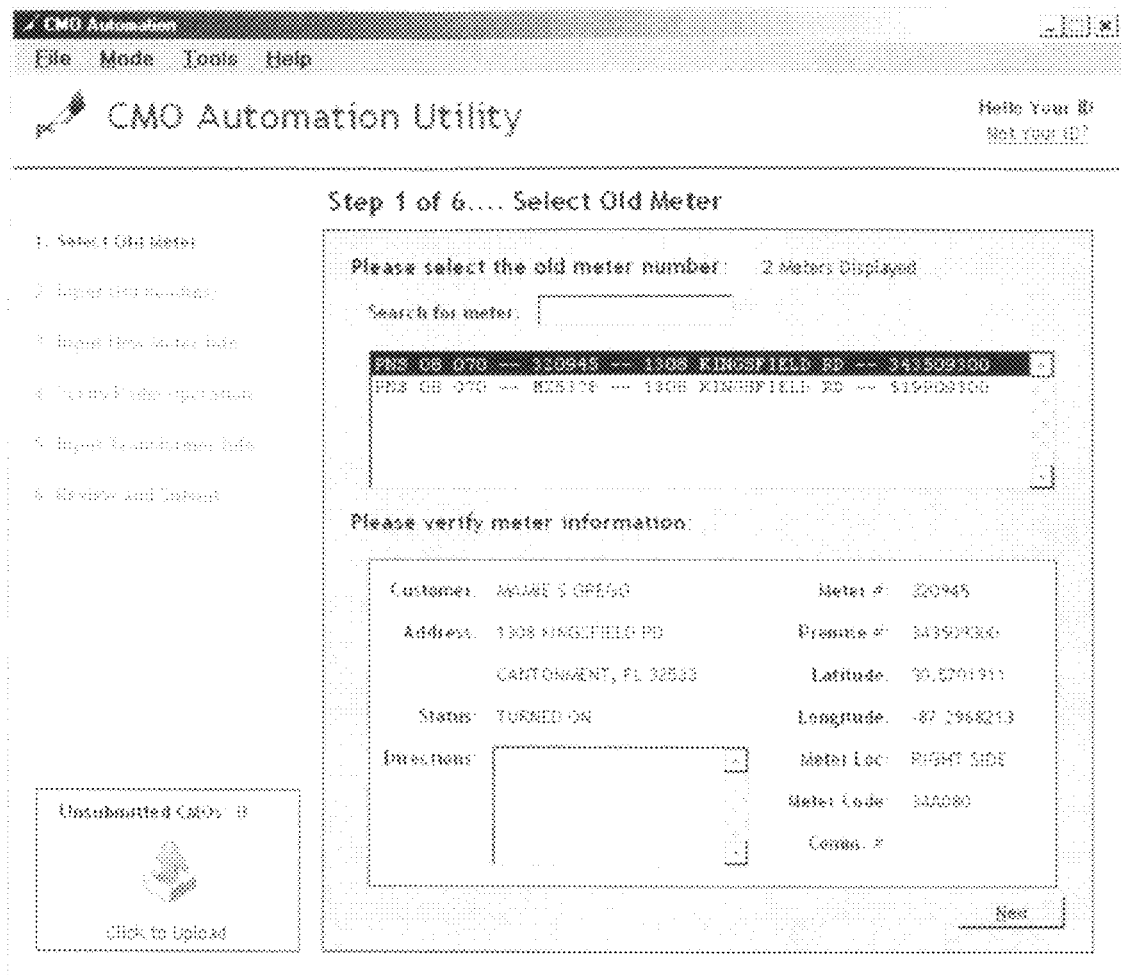
FIG. 7 illustrates a user interface for the select the meter to remove process step implemented by a Change Meter Order Automation utility in an exemplary embodiment.
Figure 14:
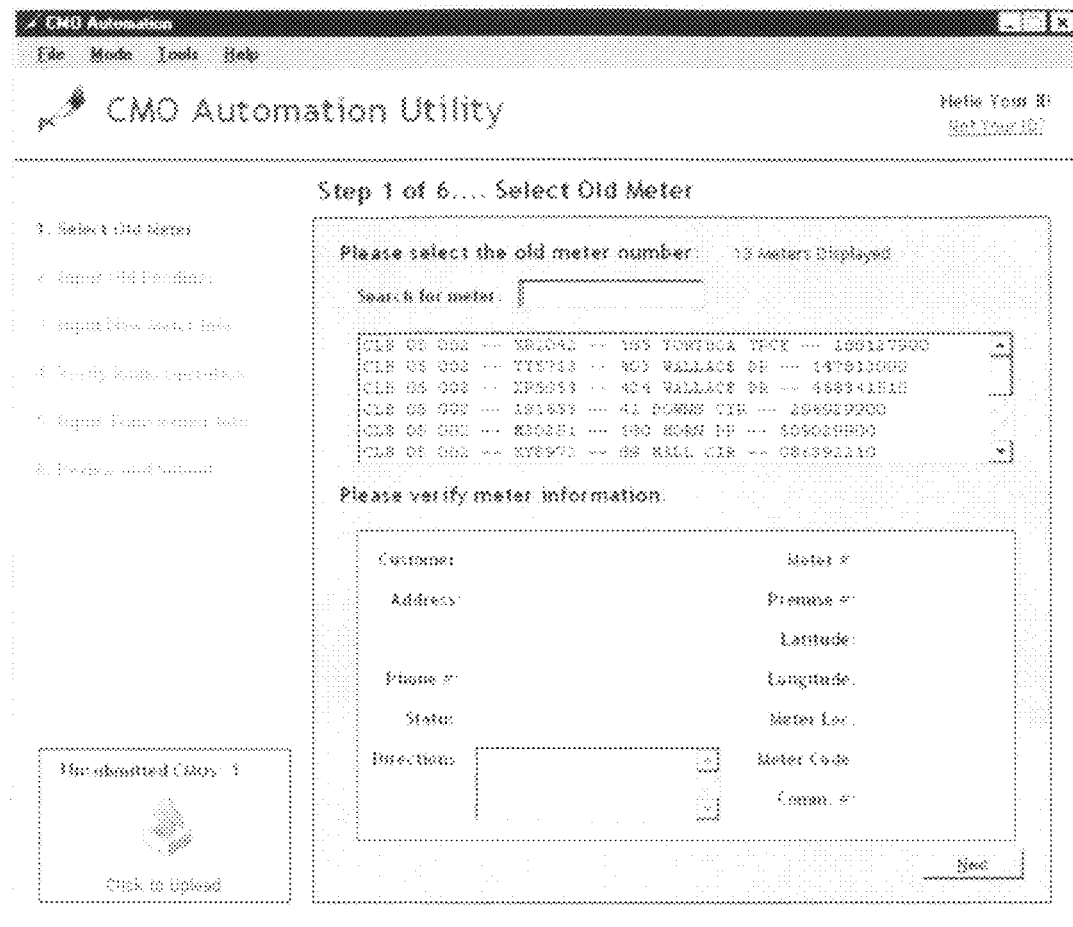
FIG. 14 illustrates a user interface for uploading a completed CMO in an exemplary embodiment.
Figure 16:
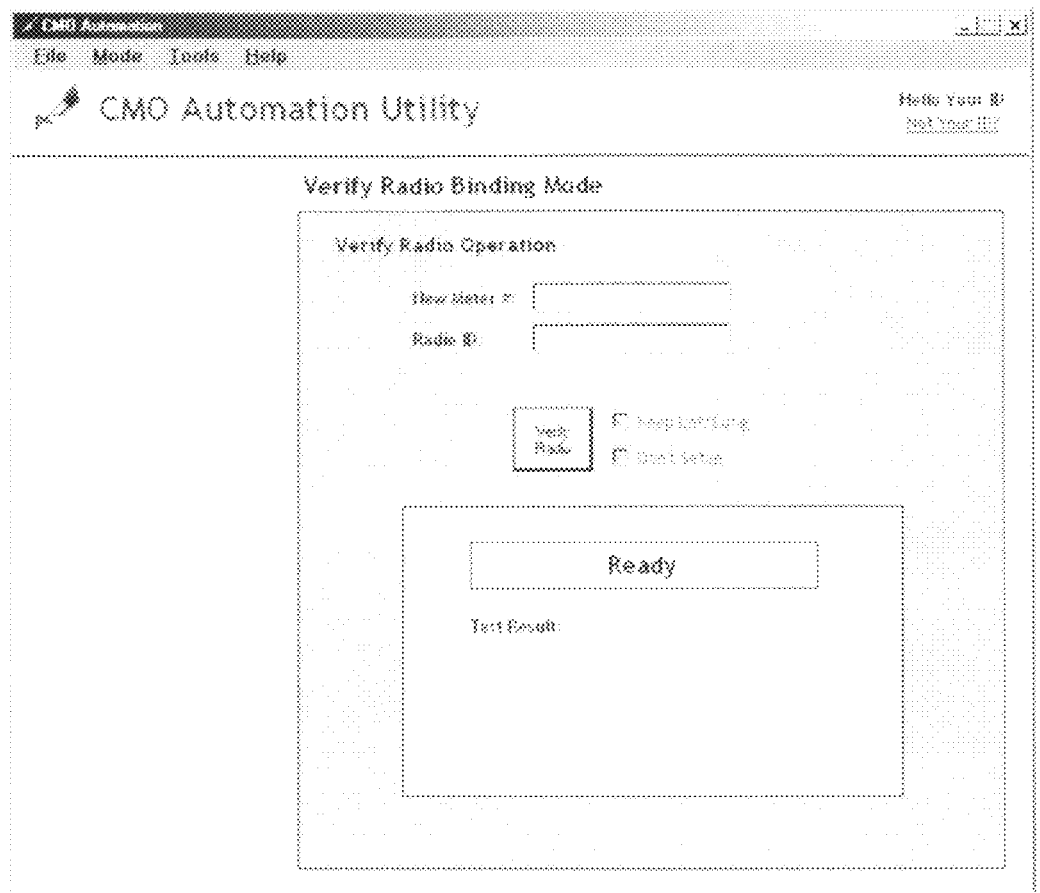
FIG. 16 illustrates a verify radio binding mode user interface in an exemplary embodiment.

The Thumb Buddy modes include an installation mode and a verify radio binding mode. To put the CMO utility in installation mode, the user clicks "Installation Mode" under the Mode menu. FIG. 16 illustrates an exemplary verify radio binding mode user interface. To put the CMO utility in "Test Radio Mode", the user clicks "Verify Radio" under the verify radio binding mode display. FIGS. 7 and 14 illustrate exemplary installation mode user interfaces.

The AMI installation audit utility evaluates the performance of the AMI installation vendor by creating and recording audits of AMI meter installations. The AMI installation audit process audits and verifies that installation vendors are installing the meters according to contractual agreements.

The AMI installation audit utility records the audits in a database and uses data from the audits to create reports based on the audit findings. These reports include tables and graphs that provide visual aides in determining whether or not all contract obligations are being met. The reports can be analyzed and feedback given to the installation vendor accordingly.

Figure 6:
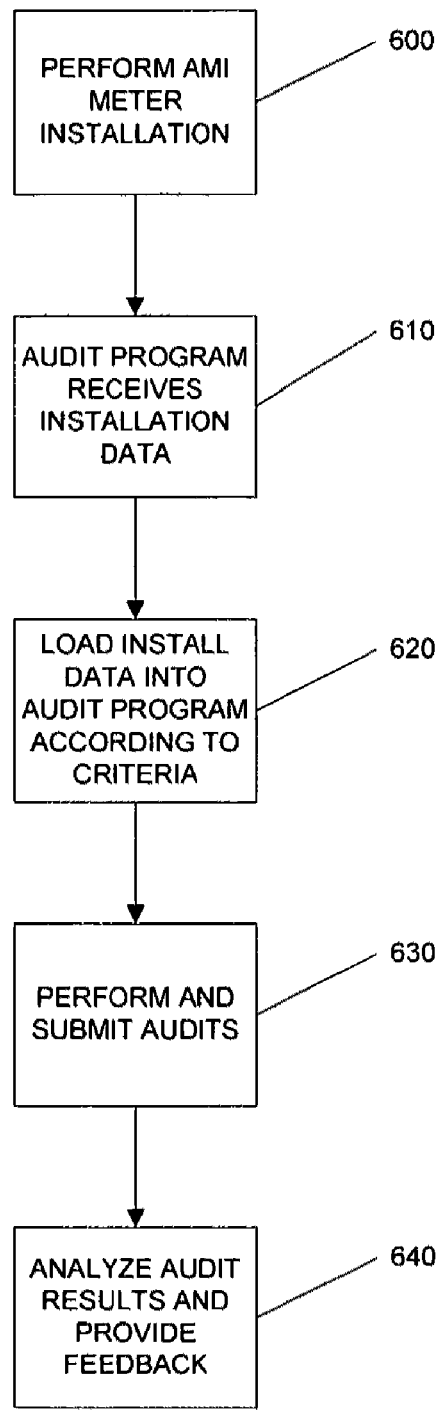
FIG. 6 illustrates a flowchart of the AMI installation audit process in an exemplary embodiment.

FIG. 6 illustrates a flowchart of the AMI installation audit process in an exemplary embodiment. Referring to block 600, the installation vendor installs the AMI meter and sends a daily install file containing all AMI installations from that day. The audit utility receives the installation data as indicated in block 610 and loads the data into the audit utility according to criteria as indicated in block 620. The audit utility can load installations by type, individuals, or location.

Certain installations are different in nature than most installations and need to be separated (i.e., socket repairs, surge protector removals, etc.). These installations loaded on a type basis may require extra payment and therefore need to be verified and audited.

The audit utility can load installations based on an individual basis. If there is a need to examine a certain installer and not the collective group, the audit utility can focus on that individual and load that individual's installations only. Loading installations on an individual basis is especially important if the vendor hires a new employee, or if an individual has a history of erroneous installations. This can help monitor any improvement or decline in performance for these individuals.

Installations can also be loaded based on location, either by street name or installations within a certain radius. For example, a user could load all installations within a mile radius of a certain point. Loading installations on a location basis improves efficiency and limits travel time between audits.

Figure 17:
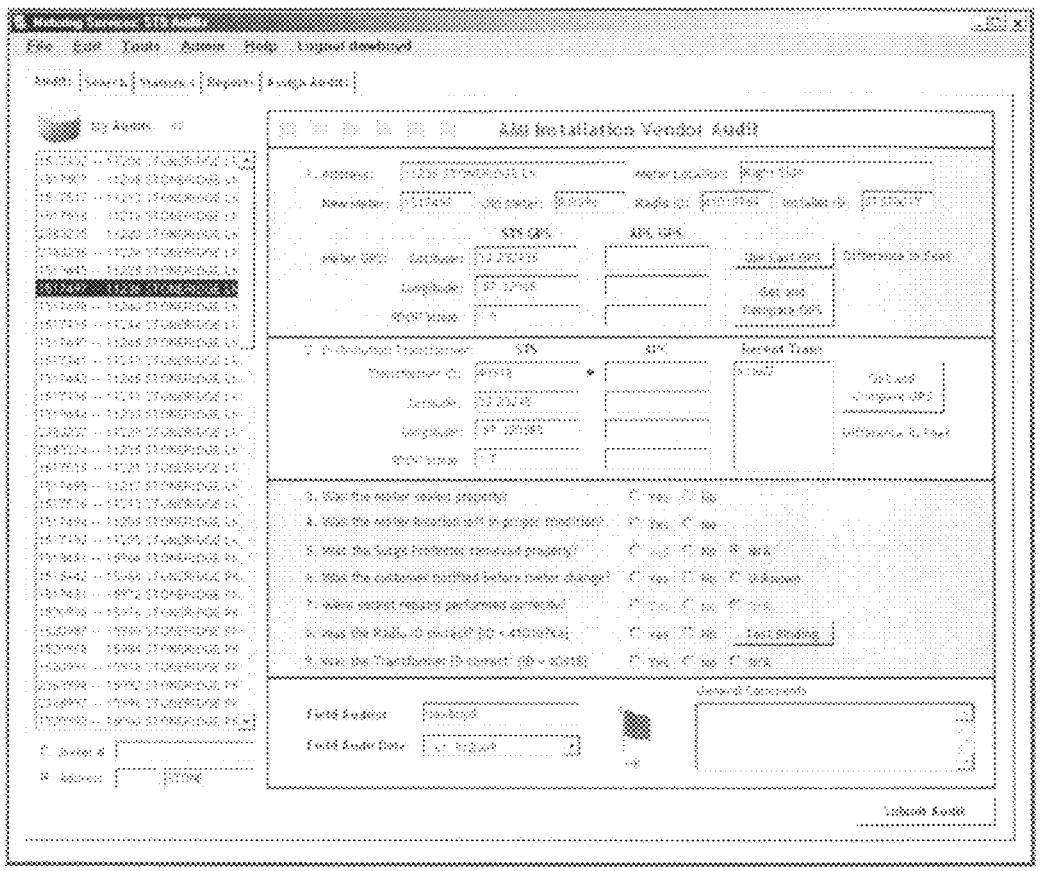
FIG. 17 illustrates an AMI Installation Audit utility "audits tab" user interface in an exemplary embodiment.

The audit utility is user based and therefore, requires the auditor to login with a valid username/password before any audits can be performed. The audit utility can support multiple auditors and installations are assigned to an auditor when loaded. This lowers the likeliness of duplicate audits. Once the audits are loaded and assigned, they are ready to be performed as indicated in logic block 630. FIG. 17 illustrates an AMI Installation Audit utility "audits tab" user interface in an exemplary embodiment. The audit is form-based with radio buttons, check boxes and drop-down boxes. This creates a user-friendly interface that increases speed and efficiency. As shown in FIG. 17, the audits tab user interface includes four blocks in the main window area. The top block includes the customer and meter location information. The next block retrieves transformer information including transformer identifier and GPS coordinates. The third block includes a series of audit questions requiring yes or no answers, and a radio binding test. The bottom block allows the auditor to flag the audit as acceptable (OK), re-audit needed, or action needed, and provides a sub-window for entering comments.

Figure 18:
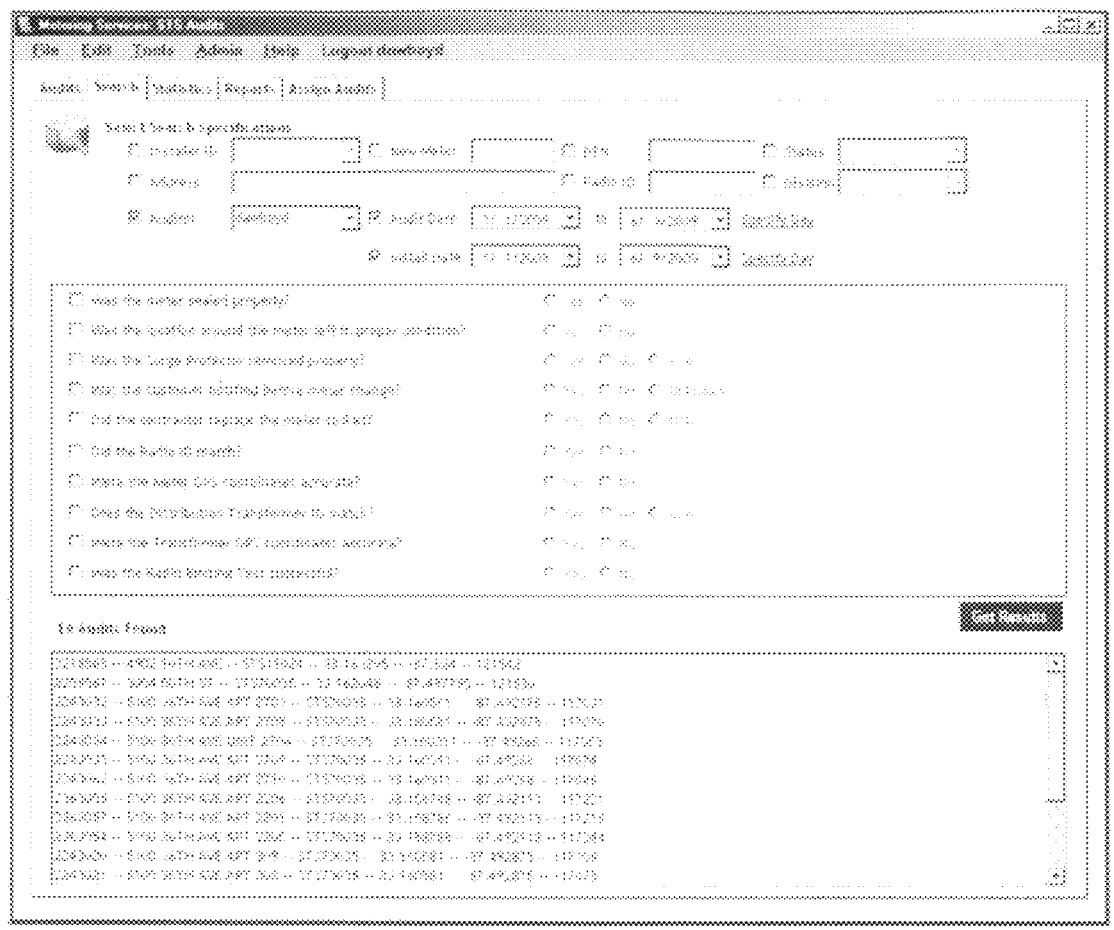
FIG. 18 illustrates an AMI Installation Audit utility "search tab" user interface in an exemplary embodiment.

FIG. 18 illustrates an exemplary AMI Installation Audit utility "search tab" user interface. The user interface allows the user to search for any audits based on numerous criteria, including, but not limited to, address, audit date, and auditor.

Figure 19:
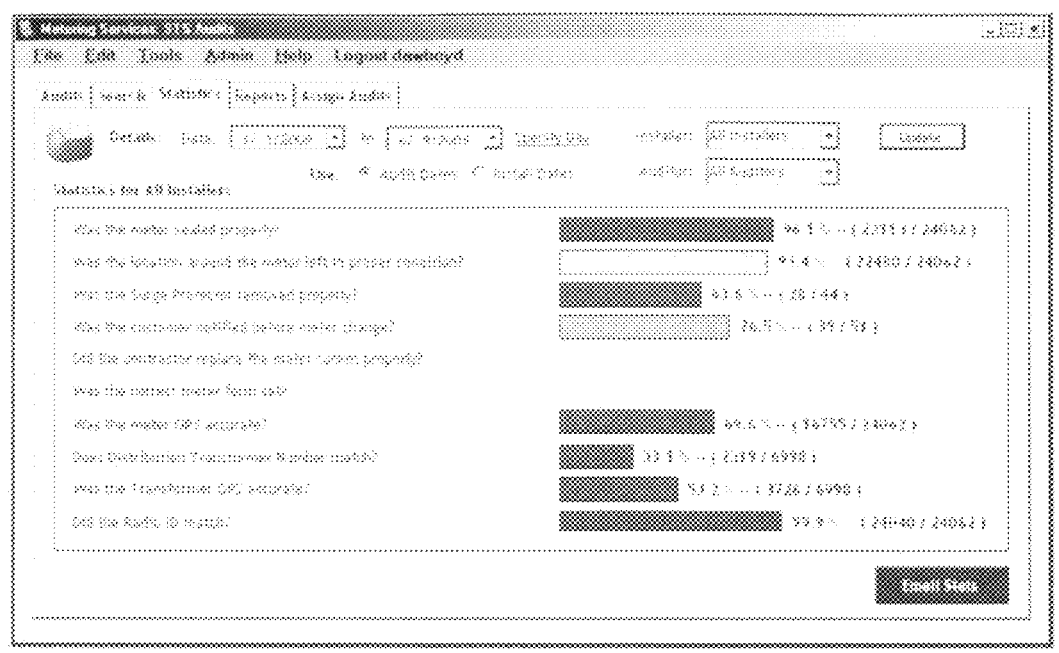
FIG. 19 illustrates an AMI Installation Audit utility "statistics tab" user interface in an exemplary embodiment.

Once audits have been performed, statistics can be created explaining the installer audit results in graphical form. FIG. 19 illustrates an exemplary AMI Installation Audit utility "statistics tab" user interface. This interface provides the results of all installer audits in a visual format.

Auditor reports provide an accurate representation of how well or how badly the vendor is performing. The auditor reports pinpoint areas that need to be improved upon, such as the GPS accuracy in FIG. 19. This information can be used as feedback for the vendor. This information is also available on an individual installer or auditor basis. In addition, reports can be generated that list all erroneous installations and can be printed or emailed to the vendor so that these installations can be repaired.

Figure 20:
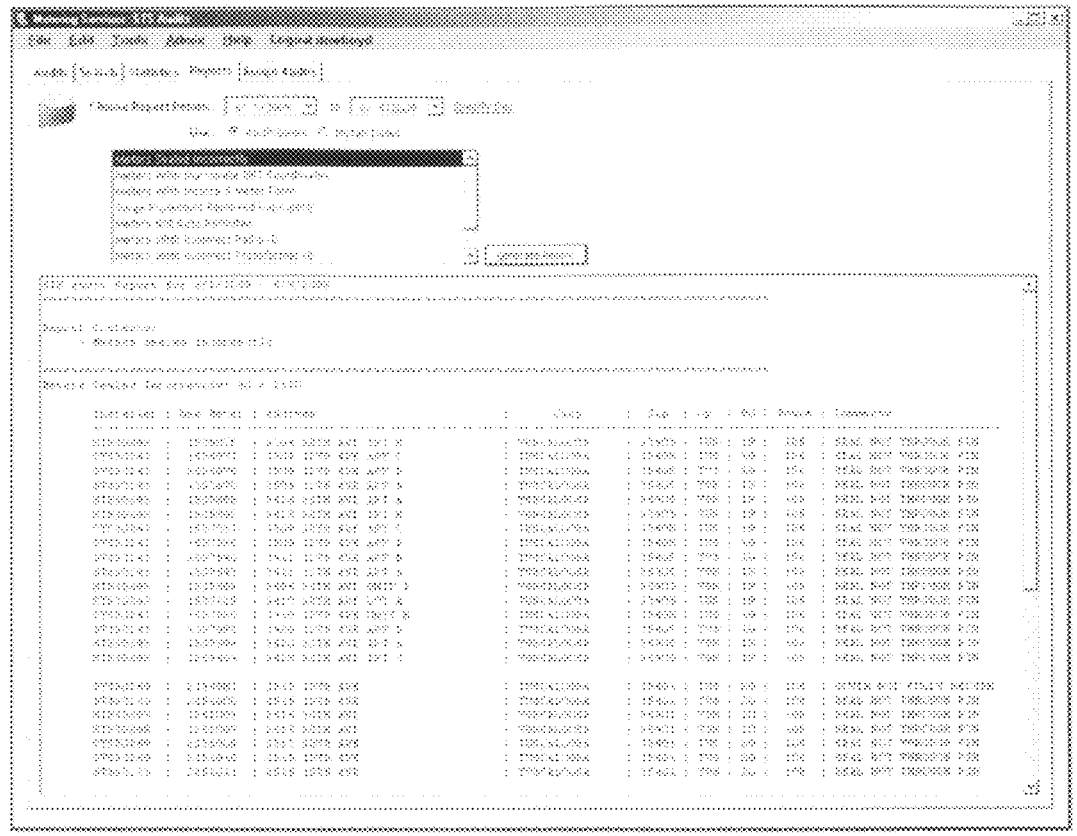
FIG. 20 illustrates an AMI Installation Audit utility "reports tab" user interface in an exemplary embodiment.
Figure 21:
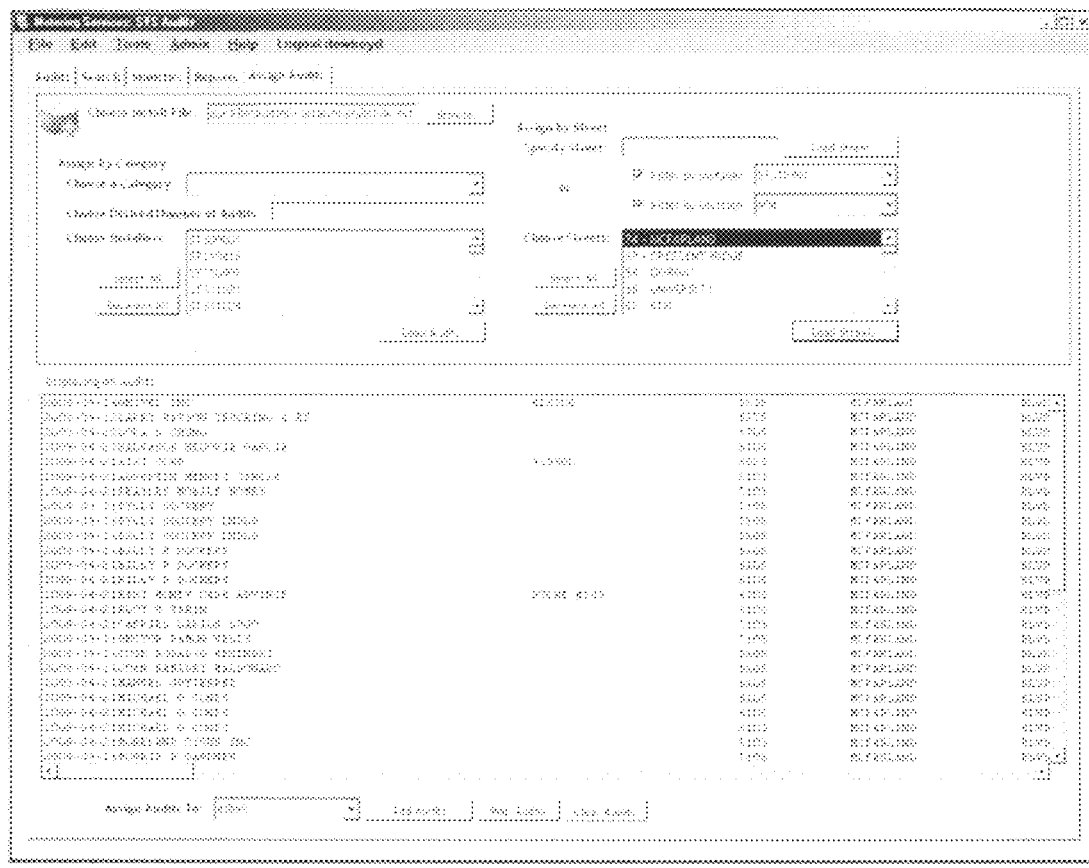
FIG. 21 illustrates an AMI Installation Audit utility "assign audits" tab user interface in an exemplary embodiment.

The audit utility can create reports on individual installer performance, auditor performance, monthly reports, quarterly reports, detailed reports on erroneous installs and an overall summary of the audit results. FIG. 20 illustrates an AMI Installation Audit utility "reports tab" user interface in an exemplary embodiment. This interface allows the user to create a report of all errors found in the vendor installations. The list generated can be sent to managers or to vendors to correct the identified errors. FIG. 21 illustrates an AMI Installation Audit utility "assign audits" tab user interface in an exemplary embodiment. This interface allows the user to assign audits to vendors based on various criteria such as category, street, installer, or division.

Embodiments of the invention have been described as computer-implemented processes. It is important to note, however, that those skilled in the art will appreciate that the mechanisms of the embodiments described are capable of being distributed as a program product in a variety of forms, and that the invention applies regardless of the particular type of computer readable storage media utilized to carry out the distribution. Examples of computer readable storage media include, without limitation, recordable-type media such as CompactFlash cards, portable hard drives, diskettes, CD ROMs, memory sticks, and flash drives.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed:

1. A method for auditing installation of smart meters at a plurality of customer locations using a computer system, comprising:
   receiving from a handheld electronic device a plurality of installation data entered into a change meter automation application for each smart meter installed, the plurality of installation data including identification of a meter being removed from a customer location, a plurality of readings from the meter being removed, identification of a smart meter being installed, identification of a smart meter radio identifier, and an indication that the smart meter radio operation has been verified as part of the installation procedure;
   loading the plurality of installation data into an auditing utility operating on the computer system based on auditing criteria;
   performing an audit for each smart meter installed via the auditing utility;
   submitting the audit for each smart meter installed for recording in an audits database;
   verifying the audit for each smart meter installed; and
   generating and analyzing an audit report stored in the audits database.

2. The method for auditing installation of smart meters of claim 1 wherein the installation audit examines at least one of the following: a meter sealing, a condition of the meter location, an accuracy of meter global positioning system (GPS) coordinates, a transformer number, a surge protector removal, a meter socket repair, a meter radio identification, and a radio binding test.

3. The method for auditing installation of smart meters of claim 1 wherein the auditing criteria for loading the plurality of installation data include installations loaded by one of the following: an installation type, an individual performing installations, and an installation location.

4. The method for auditing installation of smart meters of claim 1 wherein identification of a meter to being removed comprises receiving change meter installation input file, verifying a location address and a number of the meter to remove, verifying that the meter to remove is in a safe condition, and verifying a seal type of the meter to remove.

5. The method for auditing installation of smart meters of claim 1 further comprising inputting a meter transformer information, and reviewing and submitting a change meter order.

6. The method for auditing installation of smart meters of claim 5 wherein inputting meter transformer information comprises entering a transformer station identifier and global positioning coordinates for the smart meter.

7. The method for auditing installation of smart meters of claim 1 wherein inputting a plurality of readings for the meter to be removed comprises entering kilowatt hours and demand readings into the change meter automation application on the handheld device.

8. The method for auditing installation of smart meters of claim 7 further comprising performing a high/low test on the handheld device to confirm the entered readings.

9. The method for auditing installation of smart meters of claim 1 wherein inputting a smart meter number and a meter radio identifier comprises scanning a bar code on the smart meter to capture the smart meter number and smart meter radio identifier.

10. The method for auditing installation of smart meters of claim 1 wherein verifying operation of the meter radio comprises at least one of detection of the smart meter, detection of a smart meter radio signal strength, and retrieval of global positioning system coordinates for the smart meter.

11. A non-transitory computer readable storage medium for controlling the auditing of smart meter installations when the non-transitory computer readable storage medium is executed on a computer system, comprising:
program instructions that receive from a handheld electronic device a plurality of installation data entered into a change meter automation application for each smart meter installed, the plurality of installation data including identification of a meter being removed from a customer location, a plurality of readings from the meter being removed, identification of a smart meter being installed, identification of a smart meter radio identifier, and an indication that the smart meter radio operation has been verified as part of the installation procedure;
program instructions that load the plurality of installation data into an auditing utility operating on the computer system based on auditing criteria;
program instructions that record an audit for each smart meter installed;
program instructions that submit the audit for each smart meter installed for recording in an audits database;
program instructions that verify the audit for each smart meter installed; and
program instructions that generate and analyze an audit report stored in the audits database.

12. The non-transitory computer readable storage medium of claim 11 wherein the program instructions for entering a smart meter number and a smart meter radio identifier comprise program instructions that capture a bar code scan on the smart meter identifying the smart meter number and smart meter radio identifier.

13. The non-transitory computer readable storage medium of claim 11 wherein the program instructions for identification of a meter being removed from a customer location comprise program instructions for receiving a change meter installation input file, program instructions for verifying a location address and a number of the meter to remove, program instructions for verifying that the meter to remove is in a safe condition, and program instructions verifying a seal type of the meter to remove.

14. The non-transitory computer readable storage medium of claim 11 further comprising program instructions for entering a change meter transformer information, and program instructions for reviewing and submitting a change meter order.

15. The non-transitory computer readable storage medium of claim 14 wherein the program instructions for entering a meter transformer information comprise program instructions for entering a transformer station identifier and a global positioning coordinates for the smart meter.

16. A system for auditing installation of smart meters, comprising:
a memory including a database for storing a plurality of information pertaining to smart meter installation;
at least one computer processor coupled to the memory for executing a plurality of software components stored in the memory, including:
a component for receiving from a handheld electronic device a plurality of installation data entered into a change meter automation application for each smart meter installed, the plurality of installation data including identification of a meter being removed from a customer location, a plurality of readings from the meter being removed, identification of a smart meter being installed, identification of a smart meter radio identifier, and an indication that the smart meter radio operation has been verified as part of the installation procedure;
a component for loading the plurality of installation data into an auditing utility operating on the computer system based on auditing criteria;
a component for recording an audit for each smart meter installed via the auditing utility;
a component for submitting the audit for each smart meter installed for recording in an audits database;
a component for verifying the audit for each smart meter installed; and
a component for generating and analyzing an audit report stored in the audits database.

17. The system for auditing installation of smart meters of claim 16 further comprising a component for enabling input of a meter transformer information, and a component for enabling review and submission of a change meter order.

* * * * *